(12) United States Patent
Van Der Wal et al.

(10) Patent No.: US 7,521,910 B2
(45) Date of Patent: Apr. 21, 2009

(54) METHOD AND DEVICE FOR MEASURING CURRENT IN A SWITCHED CURRENT PATH OF A CIRCUIT

(75) Inventors: Roelf Van Der Wal, Eindhoven (NL); Antonius Jacobus Johannes Werner, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 297 days.

(21) Appl. No.: 10/563,641

(22) PCT Filed: Jul. 2, 2004

(86) PCT No.: PCT/IB2004/051104

§ 371 (c)(1),
(2), (4) Date: Jan. 6, 2006

(87) PCT Pub. No.: WO2005/004318

PCT Pub. Date: Jan. 13, 2005

(65) Prior Publication Data

US 2006/0158166 A1 Jul. 20, 2006

(30) Foreign Application Priority Data

Jul. 8, 2003 (EP) .................................. 03102048

(51) Int. Cl.
*G05F 1/00* (2006.01)
(52) U.S. Cl. ........................ 323/282; 323/273; 323/277; 363/41
(58) Field of Classification Search ................. 323/282, 323/273, 277; 363/41
See application file for complete search history.

(56) References Cited

U.S. PATENT DOCUMENTS

| | | | | |
|---|---|---|---|---|
| 4,298,838 A | * | 11/1981 | Akamatsu et al. | ........ 324/117 R |
| 4,811,184 A | * | 3/1989 | Koninsky et al. | ............. 363/17 |
| 4,896,242 A | * | 1/1990 | Neft | ............................ 361/87 |
| 5,602,464 A | * | 2/1997 | Linkowsky et al. | ......... 323/272 |
| 5,610,508 A | | 3/1997 | Kammiller | |
| 5,661,348 A | * | 8/1997 | Brown | .......................... 307/43 |
| 5,815,391 A | | 9/1998 | Pelly | |
| 5,923,548 A | | 7/1999 | Kammiller | |
| 6,297,617 B1 | | 10/2001 | Aoyama | |
| 6,441,597 B1 | * | 8/2002 | Lethellier | .................... 323/282 |
| 6,501,342 B2 | * | 12/2002 | Marten | ....................... 331/173 |
| 6,895,229 B2 | * | 5/2005 | Schetelig et al. | .......... 455/226.1 |
| 6,944,034 B1 | * | 9/2005 | Shteynberg et al. | ....... 363/21.13 |
| 7,092,265 B2 | * | 8/2006 | Kernahan | ..................... 363/65 |
| 2002/0185987 A1 | * | 12/2002 | Kushida et al. | ............. 318/599 |
| 2004/0041548 A1 | * | 3/2004 | Perry | .......................... 323/282 |

* cited by examiner

*Primary Examiner*—Akm E Ullah
*Assistant Examiner*—Arun Williams

(57) ABSTRACT

A method and device for measuring a switched current ($I_H$) comprises: sensing the switched current ($I_H$) with an AC current transformer to obtain an intermediate measuring signal ($V_{HM}$); receiving a timing signal indicating on and off periods of the switched current ($I_H$); during an off period, generating an auxiliary signal such that the sum of the intermediate measuring signal and the auxiliary signal is equal to zero; and during an on period, adding the intermediate measuring signal and said auxiliary signal and providing the sum signal as the output measuring signal, the output measuring signal reflecting an actual value of the AC part and the DC part of the switched current (IH).

14 Claims, 2 Drawing Sheets

METHOD AND DEVICE FOR MEASURING CURRENT IN A SWITCHED CURRENT PATH OF A CIRCUIT

The present invention relates in general to a method and device for sensing current. Particularly, the present invention relates to a method and device for sensing current in a half-bridge driver, for instance in a switching amplifier. More particularly, the present invention relates to a method and device for sensing current in a switched current path, where current is periodically switched between an unknown magnitude during a first part of a period and a predetermined fixed magnitude during a second part of the period.

FIG. 1A illustrates a half bridge driver circuit 1 for generating an AC current in a load L powered from a DC voltage source $V_{DC}$ having a high voltage terminal 2 and a low voltage terminal 3. The half bridge driver circuit 1 comprises a series arrangement of two controllable switches 11 and 12 arranged between said high voltage terminal 2 ($V_{HIGH}$) and a low voltage terminal 3 ($V_{LOW}$), wherein the first switch 11 is coupled between the high voltage terminal 2 and a node A, and wherein the second switch 12 is coupled between the low voltage terminal 3 and this node A. The current path between the high voltage terminal 2 and said node A is indicated as first bridge branch 21; the current path between the low voltage terminal 3 and said node A is indicated as second bridge branch 22. Said node A between said switches 11, 12 is coupled to an output terminal 6 via an inductor 4. A capacitor 7 is coupled in parallel to the load L. The switches are usually implemented as MOSFETs, as illustrated.

A switch driver 13 has output terminals 14 and 15, coupled with control terminals of said switches 11, 12, respectively. In a first operative state, which will be referred to as high state, the switch driver 13 is adapted to generate control signals for said switches 11 and 12 such that the first switch 11 is conductive (ON) while the second switch 12 is non-conductive (OFF); in that case, a current $I_H$ will flow through the inductor 4 in a direction from the high voltage terminal 2 to the output terminal 6, causing the voltage level at the output terminal 6 to rise. In a second operative state, which will be referred to as low state, the switch driver 13 is adapted to generate control signals for said switches 11 and 12 such that the first switch 11 is non-conductive (OFF) while the second switch 12 is conductive (ON); in that case, a current $I_L$ will flow through the inductor 4 in the opposite direction, i.e. in a direction from the output terminal 6 to the low voltage terminal 3, causing the voltage level at the output terminal 6 to drop.

The switch driver 13 has an input terminal 16 receiving timing signals, which control the switch driver 13 to be alternating between its high state and its low state. The resulting currents in the inductor 4 and switches 11, 12 are illustrated in the graph of FIG. 1B.

FIG. 1B is a graph illustrating signal shapes. In the coil 4, a triangular current shape $I_4$ is generated, having a positive slope during the high state of the switch driver 13, and having a negative slope during the low state of the switch driver 13. The maximal current magnitude is indicated as $I_{MAX}$, the minimal current magnitude is indicated as $I_{MIN}$. This current can be considered as a DC current with DC current magnitude $I_{DC}$, indicated as a dotted line, and positive amplitude $I_{MAX}-I_{DC}$ and negative amplitude $I_{MIN}-I_{DC}$.

The current $I_H$ through the first switch 11 has the same magnitude as $I_4$ during the high state of the switch driver 13, but is zero during the low state of the switch driver 13. Similarly, the current $I_L$ through the second switch 12 has the same magnitude as $I_4$ during the low state of the switch driver 13, but is zero during the high state of the switch driver 13.

Circuits like circuit 1 are used in many types of applications, for instance in drivers for gas discharge lamps, motor drivers, DA power inverters, switching amplifiers, etc. The present invention is not restricted to one of such applications, but can be used in any of those applications, and others not mentioned in the above.

In general, for instance for control purposes, it is desirable to have a measuring signal representing the current $I_4$ in the inductor 4.

For measuring this current, several possibilities exist, all having drawbacks.

In one possibility, a measuring resistance may be arranged in series with the inductor 4; however, this involves the drawback of increased dissipation. For measuring small current values, this may be found acceptable, but in cases with high currents, e.g. in the order of 50 A, the dissipation in a measuring resistor is unacceptable. Further, using a measuring resistor introduces a problem of galvanic insulation, which is needed to reference the DC level of the measurement signal to the measurement GND level.

In another possibility, a DC current transducer with a Hall-element or the like may be used; however, such devices are not fast enough. In a third possibility, an AC current transducer may be used; however, then no information regarding the DC level of the current is obtained.

In another approach, the coil current is not measured in the common coil branch between node A and output 6, but in each of the switch branches between the high voltage terminal 2 and node A on the one hand and between the low voltage terminal 3 and node A on the other hand. The coil current can be reconstructed from the two measured currents, since the coil current is a summation of the two switch currents, taking the current direction into account.

U.S. Pat. No. 5,815,391 discloses a circuit embodying this approach. This measuring circuit comprises two AC current transformers associated with the respective switch branches. The outputs of the two AC current transformers are added together. Switching circuitry is provided for assuring that, during the period when a switch is non-conductive (off-period), the output signal from the corresponding AC current transformer does not contribute to the overall measuring output signal. This result is achieved by disconnecting the corresponding AC current transformer from a measuring resistor (FIG. 5 of the publication). In another embodiment, two Rogowski flux coils are used, of which the output voltages are integrated and summed. In this embodiment, said result is achieved by making the output of a corresponding integrator equal to zero (FIG. 6 of the publication) during the off-period.

This sensing circuit is only capable of measuring the DC level of the coil current if the integrator is reset at the right moment. Rogowski flux coils are typically bulky, expensive, and have a relatively limited frequency range.

Further, in the embodiment disclosed by the publication, the magnetizing current is driven to zero by a flyback voltage developed over a pair of clamping zener diodes. This will introduce inaccuracies in practical implementations. First, because the inductance of the AC current transformer will resonate with the parasitic capacitance of the secondary winding, so that the magnetizing current will not be driven to zero but will contain a sine-shaped current contribution. Second, the zener diodes will also show a certain leak-current that will introduce non-linearities.

It is a general objective of the present invention to overcome said disadvantages.

Specifically, it is an objective of the present invention to provide a measuring circuit and method capable of providing a measuring signal representing actual value of the coil current, i.e. the AC part as well as the DC part of the coil current.

Further, it is an objective of the present invention to provide a measuring circuit and method capable of accurately sensing current in a switched current path, where current is periodically switched between an unknown magnitude during a first part of a period and a predetermined fixed magnitude during a second part of the period.

According to an important aspect of the present invention, an offset signal is added to the measured current signal, the offset signal being chosen such that, during the off-state of a switch, the corresponding measurement signal is equal to zero. Then, during the on-state of such switch, the same offset is applied, so that the corresponding measurement signal accurately reflects the actual current.

These and other aspects, features and advantages of the present invention will be further explained by the following description of the present invention with reference to the drawings, in which same reference numerals indicate same or similar parts, and in which.

Figure 1A:
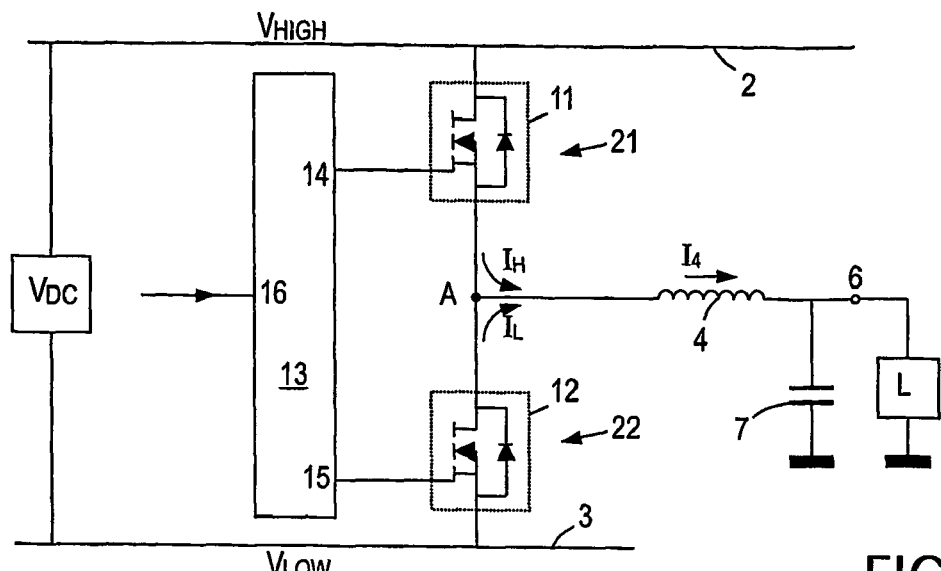
FIG. 1A is a block diagram schematically illustrating a half-bridge driver.
Figure 1B:
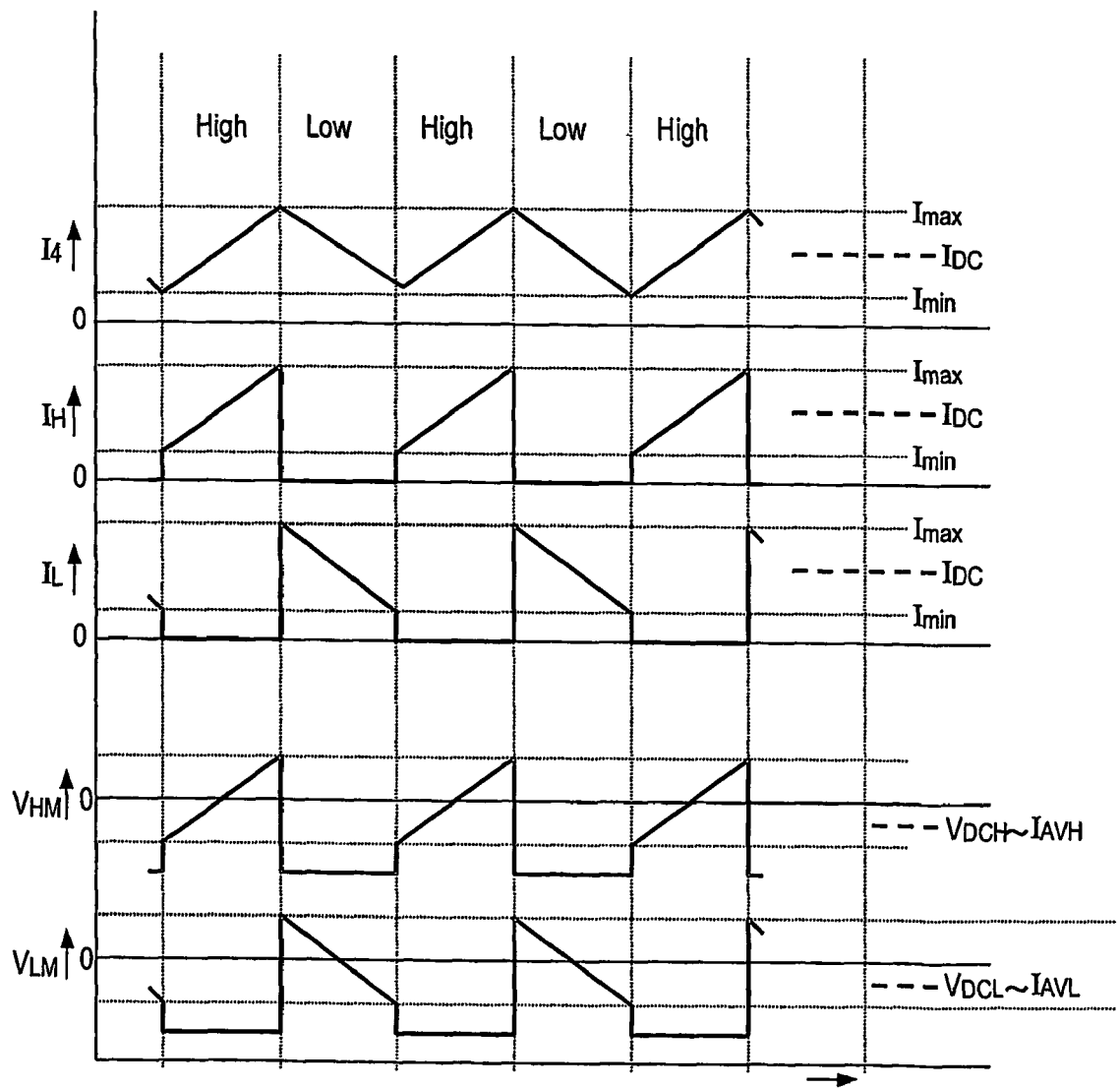
FIG. 1B is a graph schematically illustrating signal shapes at various locations in the half-bridge driver of FIG. 1A.
Figure 2:
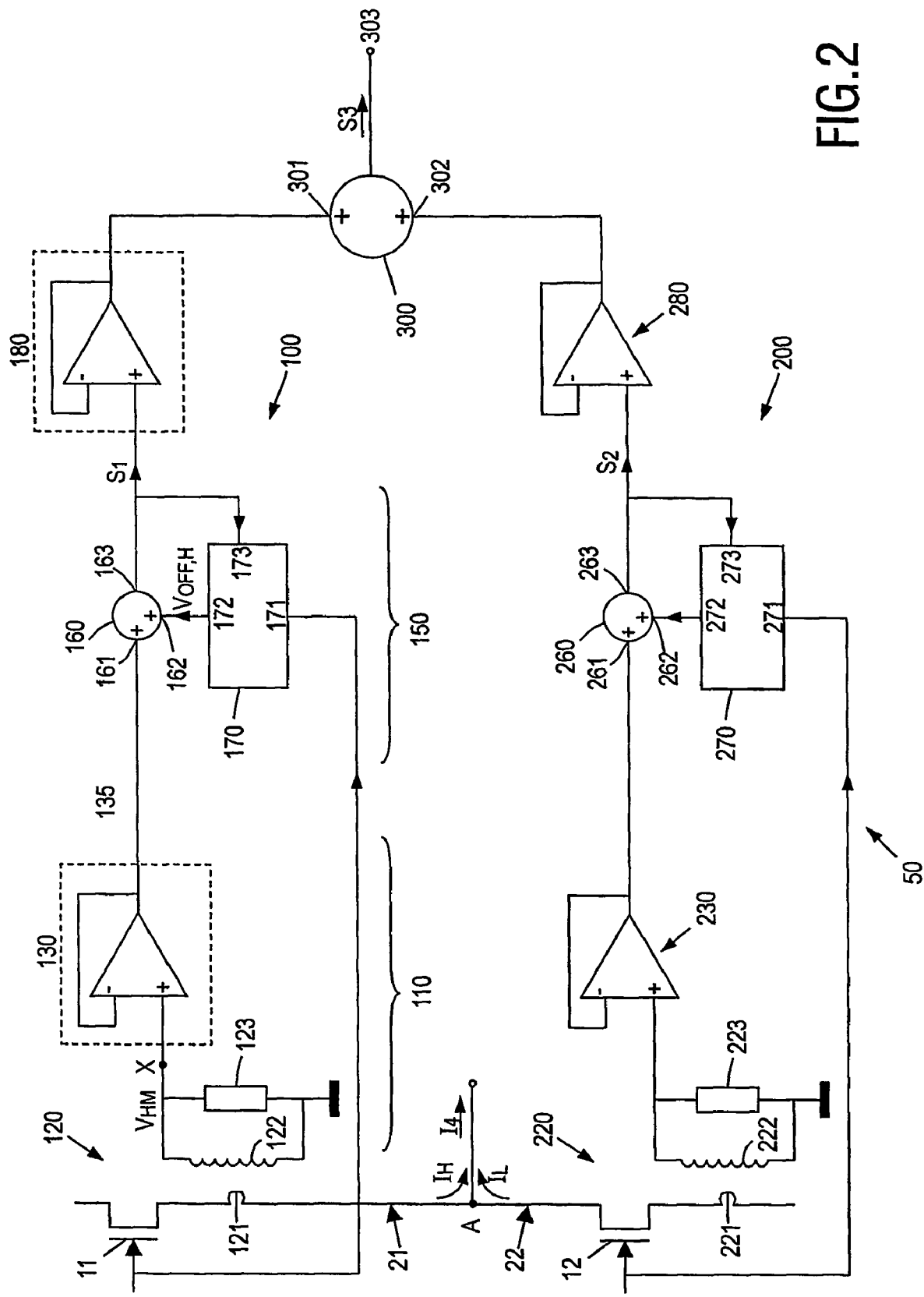
FIG. 2 is a block diagram schematically illustrating a current sensing circuit according to the present invention.

FIG. 2 is a block diagram schematically illustrating a current sensing circuit 50 comprising a first switch current measuring circuit 100 according to the present invention. The first switch current measuring circuit 100 comprises a current sensing stage 110 and an offset stage 150.

The current sensing stage 110 comprises a current sensor 120, in this embodiment an AC current transformer 120, having a primary winding 121 coupled in series with the first switch 11, and having a secondary winding 122 coupled in parallel to a measuring resistor 123, which has one terminal connected to a reference voltage level, in this case ground. At the opposite terminal of the measuring resistor 123, indicated as point X, a transformer output voltage signal is provided, which will be indicated as intermediate measuring voltage signal $V_{HM}$, and which has the same shape as the current $I_H$ through the first switch 11 but a DC level $V_{DCH}$ corresponding to the average current magnitude $I_{AVH}$ Of current $I_H$. Normally, the average current magnitude $I_{AVH}$ of the current $I_H$ through the first switch 11 may be lower or higher than the DC level of the current $I_4$ in coil 4.

Optionally, the current sensing stage 110 may comprise a buffer circuit 130, as shown.

It is noted that the intermediate measuring signal ($V_{HM}$) corresponds to an AC part of said current ($I_H$), although, depending on the embodiment of the current sensor, the intermediate measuring signal ($V_{HM}$) may comprises a DC part, either caused by said current ($I_H$) or, as an offset, caused by the sensor itself.

The intermediate measuring voltage signal $V_{HM}$ is coupled to a first input 161 of an adder 160 of the offset stage 150, which comprises an offset generator 170 having an output 172 coupled to a second input 162 of the adder 160. The adder 160 has an output 163 providing a sum signal S1. The offset generator 170 has a timing input 171 for receiving a signal indicating the off state of the first switch 11, i.e. the low state of the switch driver 13. In the embodiment shown, the timing input 171 of the offset generator 170 is coupled to the first output 14 of the switch driver 13. The offset generator 170 further has a feedback input 173 coupled to the output 163 of the adder 160.

The offset generator 170 is designed, during the off state of the first switch 11, to generate at its output 172 an auxiliary signal or offset signal $V_{OFF,H}$ such that the output voltage at the output 163 of the adder 160, indicated at point Z, is equal to zero, corresponding to the fact that during this off state the current $I_H$ trough the first switch 11 is equal to zero.

The offset generator 170 is further designed, during the on state of the first switch 11, to generate at its output 172 the same offset signal $V_{OFF,H}$ as determined during the previous off state period. As a result, the shape of the adder output signal $S_1$ is an accurate representation of the current $I_H$ in the first switch 11.

In an exemplary embodiment, the offset generator 170 may comprise a control loop for regulating the offset signal $V_{OFF,H}$ during the off state of the first switch 11 in combination with a sample-and-hold circuit for holding the offset signal $V_{OFF,H}$ during the on state of the first switch 11, as will be clear to a person skilled in the art.

Optionally, the offset stage 150 may comprise a buffer circuit 110, as shown.

It is noted that, for some applications, it is sufficient to have a measuring signal accurately reflecting the current in one switch only. Therefore, the switch current measuring circuit 100 is to be considered an embodiment of the present invention.

The current sensing circuit 50 of FIG. 2 is intended to provide a measuring signal accurately reflecting the current in coil 4. Therefore, according to the present invention, the current sensing circuit 50 comprises a second switch current measuring circuit 200 which preferably has an identical design as the first switch current measuring circuit 100. In FIG. 2, components of the second switch current measuring circuit 200 are indicated with the same reference numerals as the corresponding components of the first switch current measuring circuit, increased by 100.

The primary winding 221 of the AC current transformer 220 of the second switch current measuring circuit 200 is coupled in series with the second switch 12, and the timing input 271 of the second offset generator 270 is coupled to the second output 15 of the switch driver 13. The operation of the second switch current measuring circuit 200 is similar as the operation of the first switch current measuring circuit 100, mutatis mutandis, so it is not necessary to repeat the explanation of the operation thereof. At its output, the second switch current measuring circuit 200 provides a measuring signal $S_2$ accurately reflecting the current $I_L$ in the second switch 12.

The current sensing circuit 50 further comprises an adder 300, having inputs 301 and 302 coupled to the outputs of the first and second switch current measuring circuits 100 and 200, respectively, and having an output 303 providing an output signal S3 which is the summation of the measuring signals provided by the first and second switch current measuring circuits 100 and 200; this output signal S3 accurately reflects the current in coil 4.

It should be clear to a person skilled in the art that the present invention is not limited to the exemplary embodiments discussed above, but that several variations and modifications are possible within the protective scope of the invention as defined in the appending claims.

For instance, instead of an implementation on the basis of voltage signals, it is also possible to construct an implementation on the basis of current signals.

Further, the timing signals indicating the ON/OFF state of corresponding switches can be obtained from other sources than the switch driver outputs 14 and 15.

The invention is not restricted to the half-bridge implementation of FIG. 2; the principle underlying the invention is also applicable in the case of a full-bridge implementation.

In the above, the present invention has been explained with reference to an embodiment having two switches connected in series, allowing the current to change direction. However, the invention is not restricted to such implementation; the principle underlying the invention is also applicable in the case of a buck implementation, wherein one of the switches (for instance: 12) is replaced by a diode, as will be clear to a person skilled in the art.

In the above, the present invention has been explained with reference to a current sensing stage comprising an AC current transformer. Instead, other types of current sensors may be used, for instance magneto-resistive sensors or Hall sensors. Such sensors are capable of measuring DC current, but have a relatively large intrinsic offset; this applies especially to magneto-resistive sensors. Such intrinsic offset can also be corrected by the method proposed by the present invention.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, etc.

Specifically, at point X, the signal can be made digital by an AD converter, and all further processing can be done in software.

The invention claimed is:

1. Method for measuring a switched current which is periodically switched on and off with use of a switch, and providing a measuring signal accurately reflecting said switched current, the method comprising:

sensing said switched current with a current sensor to obtain an intermediate measuring signal corresponding to an AC part of said switched current, wherein the current sensor includes an AC current transformer having a primary winding coupled in series with the switch, the AC current transformer further having a secondary winding for providing the intermediate measuring signal;

receiving a timing signal indicating the on and off periods of the switched current;

during an off period of the switch, generating an auxiliary signal such that the sum of (i) said intermediate measuring signal during the off period and (ii) said auxiliary signal generated during the off period is equal to zero; and during an on period of the switch, summing (i) said intermediate measuring signal during the on period and (ii) said auxiliary signal that was generated during the off period; and providing the sum signal from the off period and from the on period as the measuring signal of the switched current, the measuring signal reflecting an actual value of the AC part and a DC part of the switched current.

2. Method according to claim 1, wherein the timing signal is a switch control signal.

3. Method for measuring a switched bridge current and for providing a measuring signal accurately reflecting said current, said switched bridge current being periodically switched between a first current source and a second current source in a bridge which comprises a first branch providing a first switched current corresponding to the first current source and a second branch providing a second switched current corresponding to the second current source, the method comprising the steps of:

providing a first measuring signal reflecting the first switched current, wherein providing the first measuring signal comprises sensing the first switched current with a first current sensor to obtain a first intermediate measuring signal corresponding to an AC part of the first switched current, wherein the first current sensor includes a first AC current transformer having a primary winding coupled in series with a first current source switch, the first AC current transformer further having a secondary winding for providing the first intermediate measuring signal; receiving a timing signal indicating the on and off periods of the first switched current; during an off period of the first switch, generating a first auxiliary signal such that the sum of (i) the first intermediate measuring signal during the off period and (ii) the first auxiliary signal generated during the off period is equal to zero; during an on period of the first switch, summing (i) the first intermediate measuring signal during the on period and (ii) the first auxiliary signal that was generated during the off period; and providing the sum signal from the off period and from the on period as the first measuring signal, the first measuring signal reflecting an actual value of the AC part and a DC part of the first switched current;

providing a second measuring signal reflecting the second switched current, wherein providing the second measuring signal comprises sensing the second switched current with a second current sensor to obtain a second intermediate measuring signal corresponding to an AC part of the second switched current, wherein the second current sensor includes a second AC current transformer having a primary winding coupled in series with a second current source switch, the second AC current transformer further having a secondary winding for providing the second intermediate measuring signal; receiving a timing signal indicating the on and off periods of the second switched current; during an off period of the second switch, generating a second auxiliary signal such that the sum of (i) the second intermediate measuring signal during the off period and (ii) the second auxiliary signal generated during the off period is equal to zero; during an on period of the second switch, summing (i) the second intermediate measuring signal during the on period and (ii) the second auxiliary signal that was generated during the off period; and providing the sum signal from the off period and from the on period as the second measuring signal, the second measuring signal reflecting an actual value of the AC part and a DC part of the second switched current; and adding the first and second measuring signals.

4. Switch current measuring circuit for measuring a current in a switch and providing a measuring signal accurately reflecting said current, the circuit comprising;

a current sensing stage for providing an intermediate measuring signal corresponding to an AC part of said current; and an offset stage for adding an offset to the intermediate measuring signal, wherein the current sensing stage includes a current sensor coupled in series with the switch, and wherein the offset stage is configured to receive a timing signal indicating the on and off periods of the switched current, wherein during an off period of the switch, the offset stage is further configured to generate an auxiliary signal such that the sum of (i) the intermediate measuring signal during the off period and (ii) the auxiliary signal generated during the off period is equal to zero, wherein during an on period of the switch, the offset stage is further configured to sum (i) the intermediate measuring signal during the on period and (ii) the auxiliary signal that was generated during the off period, and to provide the sum signal from the off period and from the on period as the measuring signal, the measuring signal reflecting an actual value of the AC part and a DC part of the switched current.

5. Switch current measuring circuit according to claim 4, wherein the current sensor of the sensing stage is configured to sense the switched current to obtain the intermediate measuring signal corresponding to the AC part of the switched current, wherein the current sensor comprises an AC current transformer having a primary winding coupled in series with the switch for sensing the current to be measured, and having a secondary winding providing the intermediate measuring signal.

6. Switch current measuring circuit according to claim 5, further comprising a measuring resistor coupled in parallel to the secondary winding of the AC current transformer.

7. Switch current measuring circuit according to claim 4, wherein the offset stage further comprises an adder having a first input coupled to receive the intermediate measuring signal provided by the current sensing stage, and having a second input coupled to an output of an offset generator, and having an output for providing the output measuring signal.

8. Switch current measuring circuit according to claim 7, wherein the offset generator has a timing input for receiving a signal indicating a current off period, and wherein the offset generator further has a feedback input coupled to the output of the adder.

9. Switch current measuring circuit according to claim 8, wherein the timing input of the offset generator is coupled to a control input of the switch.

10. Switch current measuring circuit according to claim 7, wherein the offset generator, during an off period of the current, is designed to generate an auxiliary signal such that the sum of said intermediate measuring signal and said auxiliary signal is equal to zero; wherein the offset generator, during an on period, is designed to add said intermediate measuring signal and said auxiliary signal and to provide the sum signal as the measuring signal.

11. Current sensing circuit for measuring a switched bridge current and for providing a measuring signal accurately reflecting said current, said switched bridge current being periodically switched between a first current direction and a second current direction in a bridge which comprises a first branch providing a first switched current corresponding to the first current direction and a second branch providing a second switched current corresponding to the second current direction; the circuit comprising:

a first switch current measuring circuit associated with said first branch, wherein the first switch current measuring circuit comprises a first current sensing stage for providing a first intermediate measuring signal corresponding to an AC part of said first switched current, and a first offset stage for adding an offset to the first intermediate measuring signal, wherein the first current sensing stage includes a first current sensor coupled in series with a first switch of the first branch, and wherein the first offset stage is configured to receive a timing signal indicating the on and off periods of the first switched current, wherein during an off period of the first switch, the first offset stage is further configured to generate a first auxiliary signal such that the sum of (i) the first intermediate measuring signal during the off period and (ii) the first auxiliary signal generated during the off period is equal to zero, wherein during an on period of the first switch, the first offset stage is further configured to sum (i) the first intermediate measuring signal during the on period and (ii) the first auxiliary signal that was generated during the off period. and to provide the sum signal from the off period and from the on period as an output signal of the first switch current measuring circuit, the output signal reflecting an actual value of the AC part and a DC part of the first switched current;

a second switch current measuring circuit associated with said second branch, wherein the second switch current measuring circuit comprises a second current sensing stage for providing a second intermediate measuring signal corresponding to an AC part of said second switched current, and a second offset stage for adding an offset to the second intermediate measuring signal, wherein the second current sensing stage includes a second current sensor coupled in series with a second switch of the second branch, and wherein the second offset stage is configured to receive a timing signal indicating the on and off periods of the second switched current, wherein during an off period of the second switch, the second offset stage is further configured to generate a second auxiliary signal such that the sum of (i) the second intermediate measuring signal during the off period and (ii) the second auxiliary signal generated during the off period is equal to zero, wherein during an on period of the second switch, the second offset stage is further configured to sum (i) the second intermediate measuring signal during the on period and (ii) the second auxiliary signal that was generated during the off period. and to provide the sum signal from the off period and from the on period as an output signal of the second switch current measuring circuit, the output signal reflecting an actual value of the AC part and a DC part of the second switched current; and an adder for adding the output signals of the first and second switch current measuring circuits.

12. A current sensing circuit according to claim 11, wherein the current sensing circuit comprises a portion of an inverter circuit.

13. A current sensing circuit according to claim 11, wherein the current sensing circuit comprises a portion of a converter circuit.

14. A current sensing circuit according to claim 11, wherein the current sensing circuit comprises a portion of an pulse width modulated circuit.

* * * * *